(12) United States Patent
Tsai et al.

(10) Patent No.: US 9,124,898 B2
(45) Date of Patent: Sep. 1, 2015

(54) METHOD AND APPARATUS OF TEMPORAL MOTION VECTOR PREDICTION

(75) Inventors: Yu-Pao Tsai, Kaohsiung (TW); Jian-Liang Lin, Yilan (TW); Yu-Wen Huang, Taipei (TW); Shaw-Min Lei, Hsinchu (TW)

(73) Assignee: MEDIATEK INC., Hsin-Chu (TW)

(*) Notice: Subject to any disclaimer, the term of this patent is extended or adjusted under 35 U.S.C. 154(b) by 427 days.

(21) Appl. No.: 13/039,555

(22) Filed: Mar. 3, 2011

(65) Prior Publication Data

US 2012/0008688 A1 Jan. 12, 2012

Related U.S. Application Data

(60) Provisional application No. 61/363,557, filed on Apr. 12, 2010, provisional application No. 61/431,454, filed on Jan. 11, 2011.

(51) Int. Cl.
*H04N 7/26* (2006.01)
*H04N 19/577* (2014.01)
(Continued)

(52) U.S. Cl.
CPC ....... *H04N 19/577* (2013.01); *H04N 19/00696* (2013.01); *H04N 19/52* (2013.01); *H04N 19/61* (2013.01)

(58) Field of Classification Search
CPC .............................................. H04N 19/00696
USPC ............................. 375/240–240.02, 240.08, 375/240.12–240.16
See application file for complete search history.

(56) References Cited

U.S. PATENT DOCUMENTS 5,598,215 A * 1/1997 Watanabe .................. 348/416.1
8,432,969 B2   4/2013 Jeon
(Continued)

FOREIGN PATENT DOCUMENTS

JP    2007067731 A    3/2007
JP    2008-153907     7/2008
(Continued)

OTHER PUBLICATIONS

English language translation of abstract of JP 2008-153907 (published Jul. 3, 2008).

*Primary Examiner* — Christopher S Kelley
*Assistant Examiner* — Jonathan Messmore
(74) *Attorney, Agent, or Firm* — McClure, Qualey & Rodack, LLP

(57) ABSTRACT

An apparatus and method for motion vector prediction for a current block in a picture are disclosed. In video coding systems, the spatial and temporal redundancy is exploited using spatial and temporal prediction to reduce the information to be transmitted. Motion Vector Prediction (MVP) has been used to further conserve the bitrate associated with motion vector. In conventional temporal MVP, the predictor is often based on a single candidate such as the co-located motion vector in the previous frame/picture. If the co-located motion vector in the previous frame/picture does not exist, the predictor for the current block is not available. A technique for improved MVP is disclosed where the MVP utilized multiple candidates based on co-located motion vectors from future and/or past reference pictures. The candidates are arranged according to priority order to provide better availability of MVP and also to provide more accurate prediction. Furthermore, the MVP technique disclosed can be operated in a closed-loop fashion so that no additional side information or minimum additional side information is required.

34 Claims, 10 Drawing Sheets

(51) Int. Cl.
*H04N 19/51* (2014.01)
*H04N 19/52* (2014.01)
*H04N 19/61* (2014.01)

(56) References Cited

U.S. PATENT DOCUMENTS

2004/0047418 A1* 3/2004 Tourapis et al. ......... 375/240.16
2008/0063075 A1* 3/2008 Kondo et al. ............ 375/240.16
2008/0137748 A1* 6/2008 Kondo et al. ............ 375/240.16
2009/0167959 A1* 7/2009 Nakamura et al. ............ 348/699
2011/0211640 A1* 9/2011 Kim et al. ................ 375/240.16

FOREIGN PATENT DOCUMENTS

| | | | |
|---|---|---|---|
| JP | 2008283490 A | 11/2008 | |
| KR | 20010084661 A | 9/2001 | |
| KR | 20080016911 A | 2/2008 | |
| KR | 1020100048435 A * | 10/2008 | ............... H04N 7/32 |
| KR | 20100048435 A | 5/2010 | |
| WO | 2007105590 A1 | 9/2007 | |

* cited by examiner

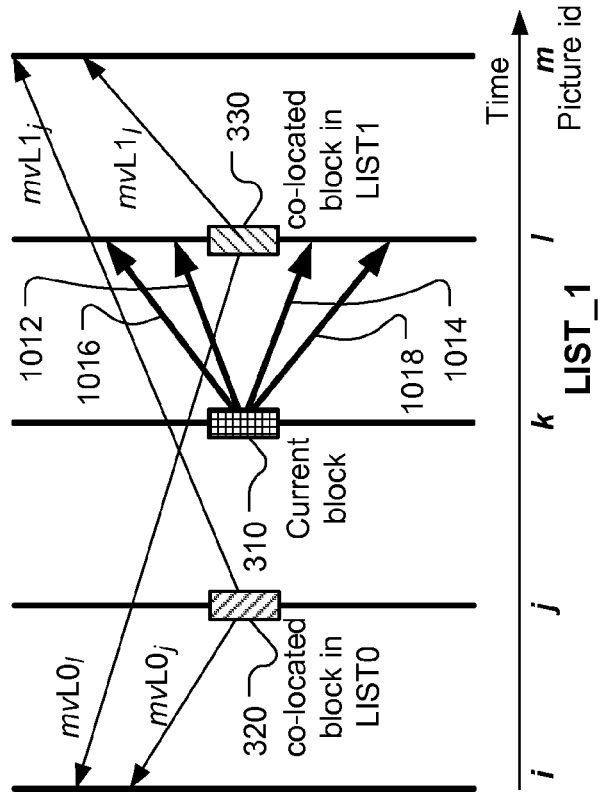
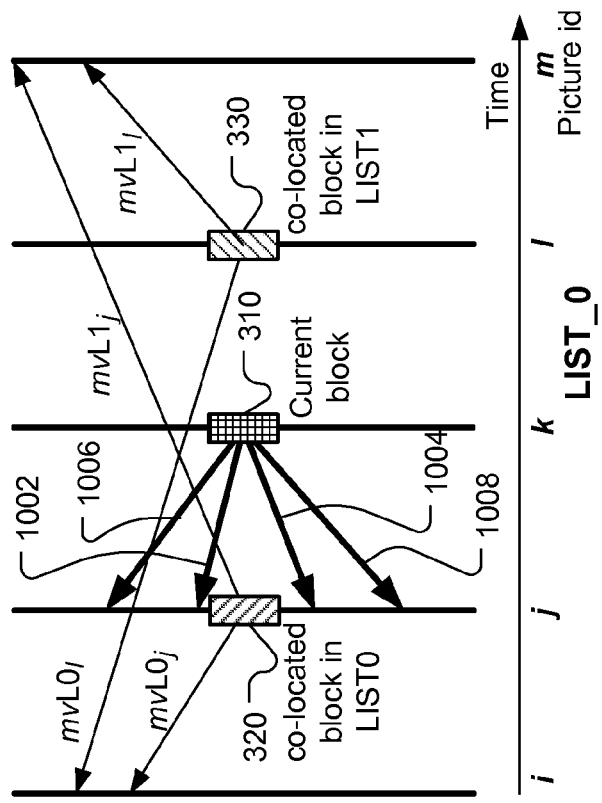
*Fig. 10B*
*Fig. 10A*

US 9,124,898 B2

METHOD AND APPARATUS OF TEMPORAL MOTION VECTOR PREDICTION

CROSS REFERENCE TO RELATED APPLICATIONS

The present invention claims priority to U.S. Provisional Patent Application No. 61/363,557, filed Jul. 12, 2010, entitled "Video coding methods for B-frame referencing co-located motion vector" and U.S. Provisional Patent Application No. 61/431,454, filed Jan. 11, 2011, entitled "Improved advanced motion vector prediction". The U.S. Provisional Patent Applications are hereby incorporated by reference in its entirety.

FIELD OF THE INVENTION

The present invention relates to video coding. In particular, the present invention relates to coding techniques associated with motion vector prediction.

BACKGROUND

In video coding systems, spatial and temporal redundancy is exploited using spatial and temporal prediction to reduce the information to be transmitted. The spatial and temporal prediction utilizes decoded pixels from the same picture and reference pictures respectively to form prediction for current pixels to be coded. In a conventional coding system, side information associated with spatial and temporal prediction may have to be transmitted, which will take up some bandwidth of the compressed video data. The transmission of motion vectors for temporal prediction may require a noticeable portion of the compressed video data, particularly in low-bitrate applications. To further reduce the bitrate associated with motion vectors, a technique called Motion Vector Prediction (MVP) has been used in the field of video coding in recent years. The MVP technique exploits the statistic redundancy among neighboring motion vectors spatially and temporally.

When MVP is used, a predictor for the current motion vector is chosen and the motion vector residue is transmitted instead of the motion vector itself to conserve bitrate associated with motion vector transmission. The MVP scheme can be applied in a closed-loop arrangement where the predictor can be derived at the decoder based on decoded information and no side information has to be transmitted. Alternatively, side information can be transmitted explicitly in the bitstream to inform the decoder regarding the type of motion vector predictor selected. While MVP can be used for inter-coded blocks to conserve bandwidth, it can also be used for SKIP and DIRECT coded blocks to substantially reduce bitrate for the underlying blocks. In conventional temporal MVP, the predictor is often based on a single candidate such as the co-located motion vector in the previous frame/picture. If the co-located motion vector in the previous frame/picture does not exist, the predictor for the current block is not available. It is desirable to improve the performance of MVP so as to reduce the bitrate of the coding system. The improvement may be achieved by designing better MVP that can provide a more accurate prediction and improve the availability of the predictor. Furthermore, it is desirable that the MVP can be operated in a closed-loop fashion so that no side information or minimum side information is required.

BRIEF SUMMARY OF THE INVENTION

An apparatus and method for motion vector prediction for a current block in a picture are disclosed. In one embodiment according to the present invention, the apparatus and method for motion vector prediction comprise steps of receiving two or more motion vectors associated with at least one temporal block from a group consisting of one or more future reference pictures and one or more past reference pictures; determining a candidate set based on said two or more motion vectors, wherein the candidate set consists of at least two elements; arranging the candidate set in a priority order; and determining a motion vector predictor or a motion vector predictor candidate or a motion vector or a motion vector candidate for the current block from the candidate set according to the priority order. The priority order is pre-defined in one embodiment according to the present invention and the priority order is determined according to an adaptive scheme in another embodiment according to the present invention. The step of determining the candidate set based on said two or more motion vectors may further comprises a step of deriving scaled motion vectors corresponding to the two or more motion vectors in an alternative embodiment according to the present invention. The candidate set may be selected from the two or more motion vectors, the scaled motion vectors, or a combination of both in various embodiments according to the present invention. The adaptive scheme may be based on a criterion selected from a group consisting of statistic of reconstructed motion vectors of previous blocks, partition type of the current block, correlation of the motion vectors, directions of motion vectors, distance of the motion vectors, and whether the motion vectors cross the current block in a case of temporal motion vector in various embodiments according to the present invention. When the scaled motion vectors are used, the adaptive scheme can be based on whether directions of scaled motion vectors are interpolation or extrapolation in an alternative embodiment according to the present invention.

In another embodiment according to the present invention, the apparatus and method for motion vector prediction comprise steps of receiving two or more motion vectors associated with at least one temporal block from a first reference picture list; determining a candidate set consisting of at least two elements based on the two or more motion vectors; arranging the candidate set in a priority order; and determining a motion vector predictor or a motion vector predictor candidate or a motion vector or a motion vector candidate for the current block from the candidate set according to the priority order. Information associated with the priority order is incorporated in a sequence header, a picture header, or a slice header. The first reference picture list may be a list 0 reference picture or a list 1 reference picture.

BRIEF DESCRIPTION OF THE DRAWINGS

FIG. 10A illustrates an example of motion vector prediction using scaled motion vectors derived for the current block with the current list equal to list 0 and RefIdxL0=0 reference picture.

FIG. 10B illustrates an example of motion vector prediction using scaled motion vectors derived for the current block with the current list equal to list 1 and RefIdxL1=0 reference picture.

DETAILED DESCRIPTION OF THE INVENTION

Figure 1:
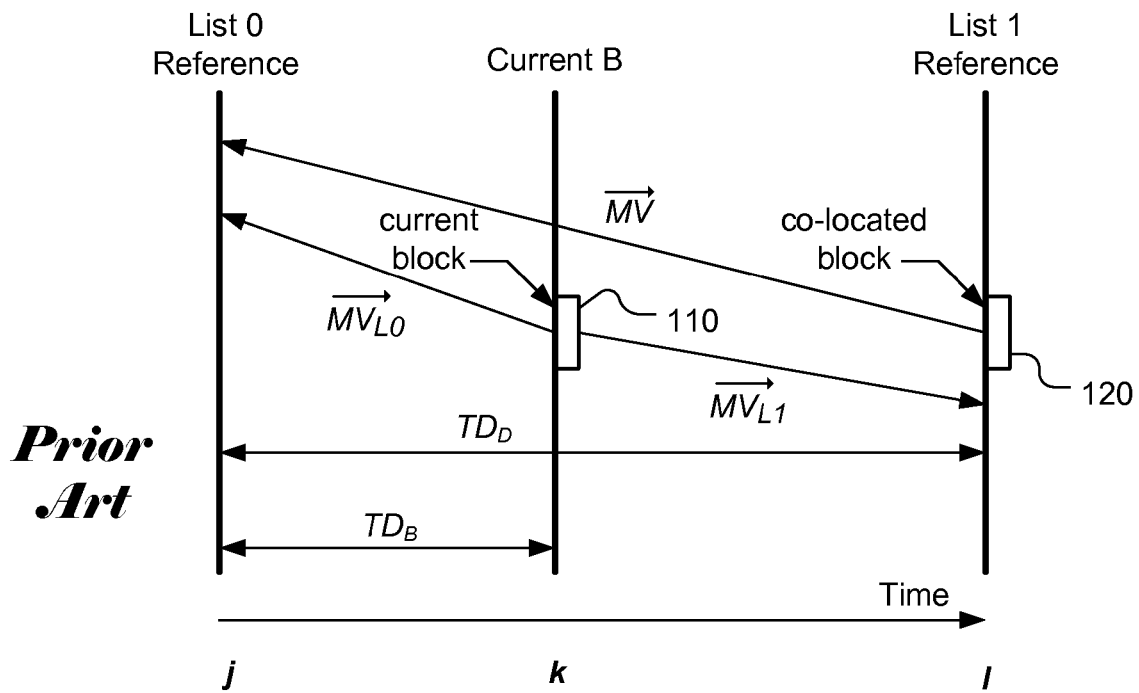
FIG. 1 illustrates motion vector scaling of DIRECT mode prediction in B slice coding according to a prior art.

In video coding systems, the spatial and temporal redundancy is exploited using spatial and temporal prediction to reduce the bitrate to be transmitted. The spatial prediction utilizes decoded pixels from the same picture to form prediction for current pixels to be coded. The spatial prediction is often operated on a block by block basis, such as 16×16 or 4×4 block for luminance signal in H.264/AVC Intra coding. In video sequences, neighboring pictures often bear great similarities, and simply using picture differences can effectively reduce the transmitted information associated with static background areas. Nevertheless, moving objects in the video sequence may result in substantial residues and will require higher bitrate to code the residues. Motion Compensated Prediction (MCP) is a popular technique to exploit temporal correlation in video sequences.

Motion compensated prediction can be used in a forward prediction fashion, where a current picture block is predicted using a decoded picture or pictures that are prior to the current picture in the display order. In addition to forward prediction, backward prediction can also be used to improve the performance of motion compensated prediction. The backward prediction utilizes a decoded picture or pictures after the current picture in the display order. Since the first version of H.264/AVC was finalized in 2003, forward prediction and backward prediction have been extended to list 0 prediction and list 1 prediction, respectively, where both list 0 and list 1 can contain multiple reference pictures prior to or past the current picture in the display order. The following describes the default reference picture list reconstruction. For list 0, reference pictures prior to the current picture have lower reference picture indices than those past the current picture. For list 1, reference pictures past the current picture have lower reference picture indices than those prior to the current picture. For both list 0 and list 1, after applying the previously described rule, the temporal distance is also considered in determining the reference picture index. Generally speaking, a reference picture closer to the current picture has a lower reference picture index. For example, assume the current picture is picture 5, and pictures 0, 2, 4, 6, and 8 are reference pictures, where the numbers denote the display order. The list 0 reference pictures with ascending reference picture indices and starting with index equal to zero are 4, 2, 0, 6, and 8. The list 1 reference pictures with ascending reference picture indices and starting with index equal to zero are 6, 8, 4, 2, and 0. The reference picture with index equal to 0 is called co-located picture, and in this example with picture 5 as the current picture, picture 6 is the list 1 co-located picture, and picture 4 is the list 0 co-located picture. When a block in a list 0 or list 1 co-located picture has the same block location as the current block in the current picture, it is called a list 0 or list 1 co-located block, or called a co-located block in list 0 or list 1. The unit used for motion estimation mode in earlier video standards such as MPEG-1, MPEG-2 and MPEG-4 is primarily based on macroblock. For H.264/AVC, the 16×16 macroblock can be segmented into 16×16, 16×8, 8×16 and 8×8 blocks for motion estimation. Furthermore, the 8×8 block can be segmented into 8×8, 8×4, 4×8 and 4×4 blocks for motion estimation. For the High Efficiency Video Coding (HEVC) standard under development, the unit for motion estimation/compensation mode is called Prediction Unit (PU), where the PU is hierarchically partitioned from a maximum block size. The MCP type is selected for each slice in the H.264/AVC standard. A slice that the motion compensated prediction is restricted to the list 0 prediction is called a P-slice. For a B-slice, the motion compensated prediction also includes the list 1 prediction and the bidirectional prediction in addition to the list 0 prediction.

In video coding systems, the motion vector and coded residues are transmitted to a decoder for reconstructing the video at the decoder side. Furthermore, in a system with flexible reference picture structure, the information associated with the selected reference pictures may also have to be transmitted. The transmission of motion vectors may require a noticeable portion of the transmitted bitrate, particularly in low-bitrate applications or in systems where motion vectors are associated with smaller blocks or high motion accuracy. To further reduce the bitrate associated with motion vector, a technique called Motion Vector Prediction (MVP) has been used in the field of video coding in recent years. The MVP technique exploits the statistic redundancy among neighboring motion vectors spatially and temporally. When MVP is used, a predictor for the current motion vector is chosen and the motion vector residue, i.e., the difference between the motion vector and the predictor, is transmitted. The MVP scheme can be applied in a closed-loop arrangement where the predictor is derived at the decoder based on decoded information and no side information has to be transmitted. Alternatively, side information can be transmitted explicitly in the bitstream to inform the decoder regarding the type of motion vector predictor selected.

In the H.264/AVC standard, there is also a SKIP mode in additional to the conventional Intra and Inter modes for macroblocks in a P slice. The SKIP mode is a very effective method to achieve large compression since there is no quantized error signal, no motion vector, nor reference index parameter to be transmitted. The only information required for the 16×16 macroblock in the SKIP mode is a signal to indicate the SKIP mode being used and therefore substantial bitrate reduction is achieved. The motion vector used for reconstructing the SKIP macroblock is similar to the motion vector predictor for a macroblock. In the H.264/AVC standard, four different types of inter-prediction are supported for B slices including list 0, list 1, bi-predictive, and DIRECT prediction, where list 0 and list 1 refer to prediction using reference picture group 0 and group 1 respectively. For the bi-predictive mode, the prediction signal is formed by a weighted average of motion-compensated list 0 and list 1 prediction signals. The DIRECT prediction mode is inferred from previously transmitted syntax elements and can be either list 0 or list 1 prediction or bi-predictive. Therefore, there is no need to transmit information for motion vector in the DIRECT mode. In the case that no quantized error signal is transmitted, the DIRECT macroblock mode is referred to as B SKIP mode and the block can be efficiently coded.

In HEVC being developed, some improvement of motion vector prediction over the H.264/AVC is being considered. In this disclosure, a system and method of motion vector prediction for B frame/picture/slice based on temporal blocks in the past and/or the future reference pictures are disclosed. The motion vector for a current block is predicted by the motion vectors of temporal blocks in the past and/or the future reference pictures effectively so that the coding efficiency for the motion vector can be improved. The temporal motion vectors are considered as candidates of predictor for the current block and the candidates are arranged in priority order. The candidate with higher priority order will be considered as predictor ahead of a candidate with a lower priority order. The advantage of priority based MVP derivation is to increase the chance that the temporal MVP candidate for a current block exists. For example, the conventional video coding system only considers the co-located motion vector in the previous frame/picture as the candidate. If that candidate does not exist, then the coding system will consider the MVP candidate for the co-located block to be unavailable. Therefore, it is desirable to increase the availability of MVP candidate so as to improve the coding efficiency of the coding system.

In the H.264/AVC standard, the temporal DIRECT mode is used for B slices where the motion vectors for a current block 110 in the B slice is derived from the motion vector of the co-located block 120 in the first list 1 reference picture as shown in FIG. 1. The motion vector derivation for the temporal DIRECT mode is described in "Direct Mode Coding for Bipredictive Slices in the H.264 Standard", authored by Tourapis et al., in IEEE Trans. on Circuits and Systems for Video Technology, Vol. 15, No. 1, pp. 119-126, January 2005. The motion vector for the co-located block of the first List 1 reference is denoted as $\vec{MV}$. The motion vectors for the current block are denoted as $\vec{MV}_{L0}$ and $\vec{MV}_{L1}$ with respect to the list 0 reference picture and list 1 reference picture. The temporal distance between the current picture and the list 0 reference picture is denoted as $TD_B$ and the temporal distance between the list 0 reference picture and the list 1 reference picture is denoted as $TD_D$. The motion vectors for the current block can be derived according to:

$$\vec{MV}_{L0} = \frac{TD_B}{TD_D} \times \vec{MV} \qquad (1)$$

$$\vec{MV}_{L1} = \frac{(TD_B - TD_D)}{TD_D} \times \vec{MV} \qquad (2)$$

The above equations were later replaced by:

$$X = \frac{(16384 + \text{abs}(TD_D/2))}{TD_D}, \qquad (3)$$

$$\text{ScaleFactor} = \text{clip}(-1024, 1023, (TD_B \times X + 32) \gg 6), \qquad (4)$$

$$\vec{MV}_{L0} = (\text{ScaleFactor} \times \vec{MV} + 128) \gg 8, \text{ and} \qquad (5)$$

$$\vec{MV}_{L1} = \vec{MV}_{L0} - \vec{MV}, \qquad (6)$$

so that X and ScaleFactor can be pre-computed at the slice/picture level. In the temporal DIRECT mode, the motion vector prediction is only based on the motion vector for the co-located block of the first list 1 reference.

Figure 2:
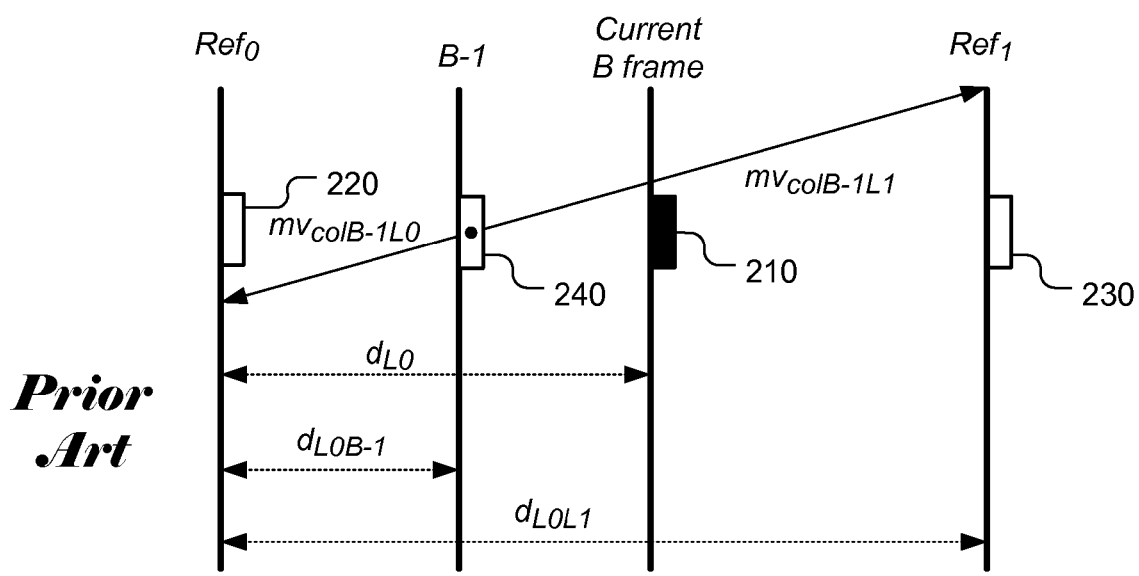
FIG. 2 illustrates motion vector scaling in B slice coding based on a co-located motion vector of the first previous B picture according to a prior art.

In another prior art, entitled "RD Optimized Coding for Motion Vector Predictor Selection", by Laroche et al., in IEEE Trans. on Circuits and Systems for Video Technology, Vol. 18, No. 12, pp. 1681-1691, December 2008, motion vector prediction selection based on motion vector competition is disclosed. The motion vector competition scheme uses RD optimization to determine the best motion vector predictor from motion vector predictor candidates. For example, as shown in FIG. 2, the temporal motion vector predictor candidates may include the list 0 motion vector corresponding to the co-located block in the list 1 co-located picture $Ref_1$, and the list 0 and list 1 motion vectors for a co-located block in the list 0 co-located picture, B-1. The list 0 motion vectors corresponding to the co-located block in the list 1 co-located picture $Ref_1$ can be calculated in the same way as defined in the H.264/AVC standard:

$$mv_1^{L0} = \frac{mv_{colL1}}{d_{L0L1}} \times d_{L0}, \text{ and} \qquad (7)$$

$$mv_1^{L1} = \frac{mv_{colL1}}{d_{L0L1}} \times (d_{L0} - d_{L0L1}). \qquad (8)$$

The list 0 and list 1 motion vectors for a co-located block in the list 0 co-located picture, B-1, can be used to derive motion vector predictor for the current block. If only the co-located motion vector $$mv_{colB-1_{L0}}$$

in picture B-1 pointing to a forward P-picture exists, the motion predictors $mv_3^{L0}$ and $mv_3^{L1}$ can be calculated according to:

$$mv_3^{L0} = \frac{mv_{col_{B-1_{L0}}}}{d_{L0B-1}} \times d_{L0}, \text{ and} \quad (9)$$

$$mv_3^{L1} = \frac{mv_{col_{B-1_{L0}}}}{d_{L0B-1}} \times (d_{L0} - d_{L0L1}). \quad (10)$$

The motion vector $$mv_{col_{B-1_{L0}}}$$

is depicted in FIG. 2 and $d_{L0B-1}$ is the temporal distance between the forward P-frame and frame B-1. In the case of backward prediction, the predictors $mv_4^{L0}$ and $mv_4^{L1}$ can be calculated according to:

$$mv_4^{L0} = \frac{mv_{col_{B-1_{L1}}}}{(d_{L0B-1} = d_{L0L1})} \times d_{L0}, \text{ and} \quad (11)$$

$$mv_4^{L1} = \frac{mv_{col_{B-1_{L1}}}}{(d_{L0L1} - d_{L0B-1})} \times (d_{L0L1} - d_{L0}). \quad (12)$$

The motion vector $$mv_{col_{B-1_{L1}}}$$

is the co-located motion vector in picture B-1 pointing to the past P-frame as depicted in FIG. 2. Depending on the availability of motion vectors $$mv_{col_{B-1_{L0}}}$$

and $$mv_{col_{B-1_{L1}}},$$

the corresponding predictors in equations (7)-(12) can be used for the current block and the RD optimization is applied to select the best motion vector predictor. The motion vector prediction scheme according to Laroche et al. will require side information to be transmitted to the decoder side to indicate the particular motion vector predictor selected. The transmission of side information associated with the selected motion vector predictor will consume some bandwidth. Regardless whether the motion vector competition scheme is enabled or disabled, temporal motion vector prediction can be beneficial for reducing motion vector residues. It is desirable to develop a temporal motion vector prediction technique to enhance any temporal motion vector predictor when the motion vector competition is not used, as well as to enhance any temporal motion vector predictor candidate when the motion vector competition is used. Moreover, it is also desirable that the enhanced temporal motion vector prediction has no additional side information or minimum additional side information.

Figure 3:
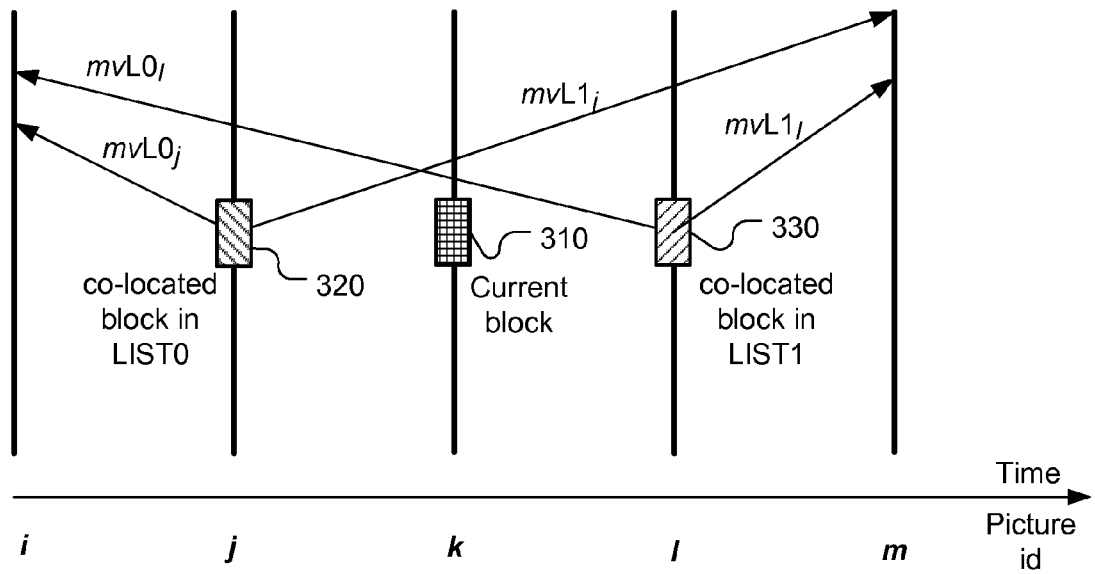
FIG. 3 illustrates an exemplary motion vector prediction using motion vectors of the co-located blocks in the list 0 and list 1 reference pictures with a pre-defined priority order.

Accordingly, a motion vector prediction technique for a current block in a picture is developed. The motion vector prediction technique of the present invention can be used to determine a motion vector predictor, a motion vector predictor candidate, a motion vector, or a motion vector candidate for the current block. The technique uses motion vectors associated with temporal blocks from the future and past reference pictures as candidates for predictor and selects a predictor according to a priority order. FIG. 3 illustrates exemplary motion vector prediction using motion vectors of co-located blocks in the past and the future reference pictures with according to a priority order. The example of future picture used in FIG. 3 is the picture belonging to list 1 with reference picture index RefIdxL1 equal to 0 and the picture is labeled as "l". The example of past picture used in FIG. 3 is the picture belonging to list 0 with reference picture index RefIdxL0 equal to 0 and the picture is labeled as "j". Furthermore, the current picture is labeled as "k", the picture belonging to list 0 with RefIdeL0>1 is labeled as "i", and the picture belonging to list 1 with RefIdeL1>1 is labeled as "m". The motion vectors mvL0 and mvL1 for a current block 310 are determined from motion vectors $mvL0_j$, $mvL1_j$, $mvL0_l$, and $mvL1_l$ of co-located block 320 of picture j and co-located block 330 of picture l respectively according to a priority order. The motion vectors $mvL0_j$ and $mvL1_j$ are referring to motion vectors for co-located block 320 of picture j pointing to a picture in list 0 and a picture in list 1 respectively. The motion vectors $mvL0_l$ and $mvL1_l$ are referring to motion vectors for co-located block 330 of picture l pointing to a picture in list 0 and a picture in list 1 respectively. These motion vector candidates will be arranged in a priority order so that a predictor can be chosen accordingly.

Figure 4:
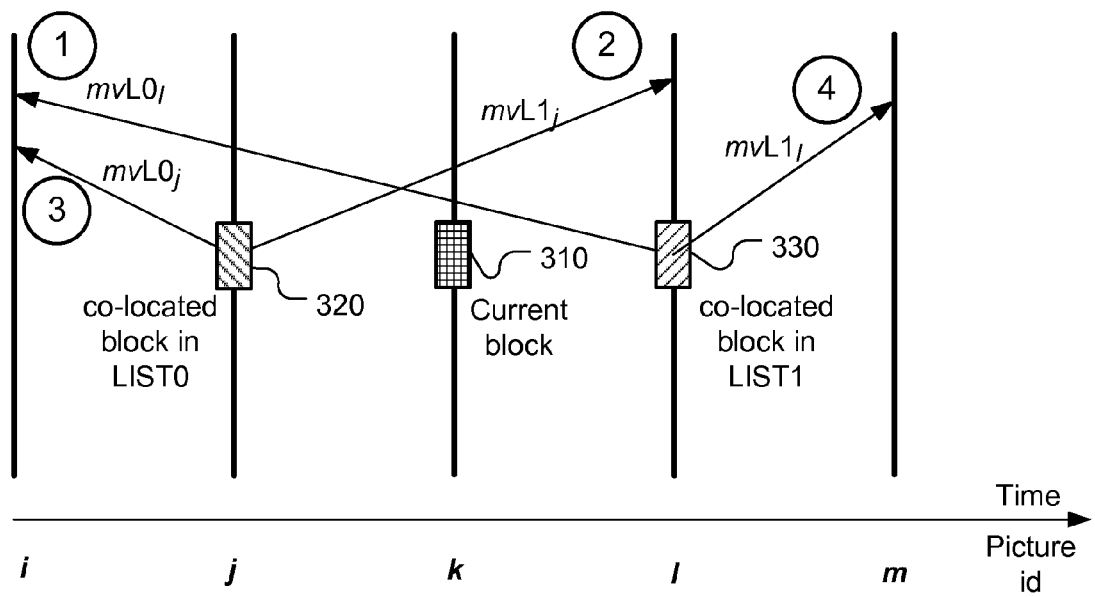
FIG. 4 illustrates an example of pre-defined priority order for the four motion vectors of FIG. 3.

FIG. 4 illustrates an example of pre-defined priority order for the four motion vector candidates of FIG. 3. The determination of motion vector predictor based on co-located motion vectors in the future and past reference pictures for the current block 310 to use a reference picture in list 0 is shown as follows:

If $mvL0_l$ exists and the corresponding reference picture (pic. id=i−1) is in the list 0 of the current picture, then mvL0=$mvL0_l$ (reference pic. id=i−1);

Else if $mvL1_j$ exists and the corresponding reference picture (pic. id=m) is in the list 0 of the current picture, then mvL0=$mvL1_j$ (reference pic. id=m);

Else if $mvL0_j$ exists and the corresponding reference picture (pic. id=j) is in the list 0 of the current picture, then mvL0=$mvL0_j$ (reference pic. id=j);

Else if $mvL1_l$ exists and the corresponding reference picture (pic. id=l) is in the list 0 of the current picture, then mvL0=$mvL1_l$ (reference pic. id=l);

Else, mvL0 is not available.

The pre-defined priority order shown above illustrates an example of determining motion vector predictor or motion vector predictor candidate mvL0 for the current block 310 to use a reference picture in list 0 and the candidates for the predictor are based on co-located motion vectors in list 0 and list 1 reference pictures. A skilled person in the art may use other pre-defined priority orders to achieve the same or similar goal.

Figure 5:
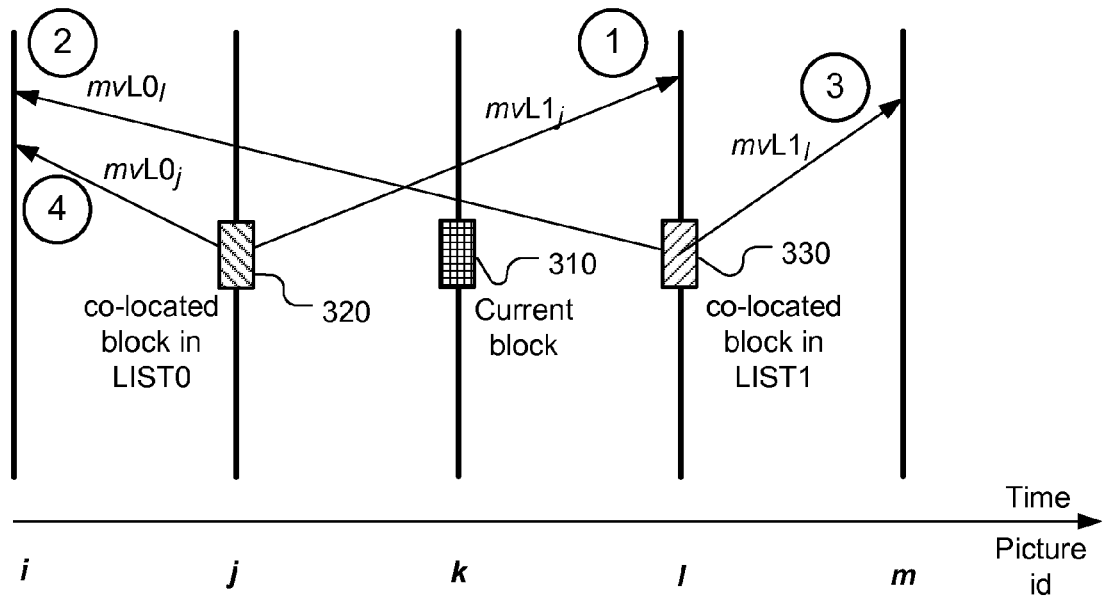
FIG. 5 illustrates an alternative pre-defined priority order for the four motion vectors of FIG. 3.

FIG. 5 illustrates another example of pre-defined priority order for the four motion vector candidates of FIG. 3. The determination of motion vector predictor based on co-located motion vectors in the future and past reference pictures for the current block 310 to use a reference picture in list 1 is shown as follows:

If $mvL1_j$ exists and the corresponding reference picture (pic. id=m) is in the list 1 of the current picture, then mvL1=mvL1$_j$ (reference pic. id=m);
Else if mvL0$_i$ exists and the corresponding reference picture (pic. id=i−1) is in the list 1 of the current picture,
then mvL1=mvL0$_i$ (reference pic. id=i−1);
Else if mvL1$_l$ exists and the corresponding reference picture (pic. id=l) is in the list 1 of the current picture,
then mvL1=mvL1$_l$ (reference pic. id=l);
Else if mvL0$_j$ exists and the corresponding reference picture (pic. id=j) is in the list 1 of the current picture,
then mvL1=mvL0$_j$ (reference pic. id=j);
Else,
mvL1 is not available.

The pre-defined priority order shown above illustrates an example of determining motion vector predictor or motion vector predictor candidate mvL1 for the current block 310 to use a reference picture in list 1 and the candidates for the predictor are based on co-located motion vectors in list 0 and list 1 reference pictures. A skilled person in the art may select other pre-defined priority orders to achieve the same or similar goal.

Figure 6:
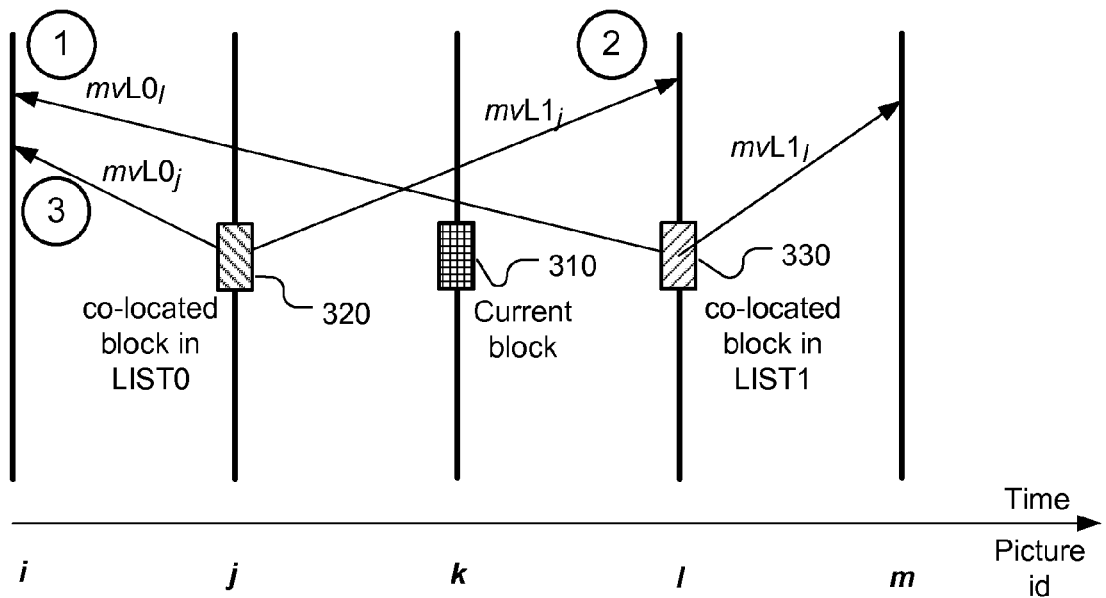
FIG. 6 illustrates an example of pre-defined priority order for the four motion vectors of FIG. 3, where only three of the four motion vectors are used as candidates for motion vector predictor.

While all four vectors are considered as candidates for the predictor or predictor candidate of the current block, not all motion vector candidates have to be used. For example, three of the four motion vectors in FIG. 3 can be used to determine the motion vector predictor or motion vector predictor candidate for the current block 310 to use a reference picture in list 0 as shown in FIG. 6:

If mvL0$_i$ exists and the corresponding reference picture is in the list 0 of the current picture,
then mvL0=mvL0$_i$ (reference pic. id=i−1);
Else if mvL1$_j$ exists and the corresponding reference picture is in the list 0 of the current picture,
then mvL0=mvL1$_j$ (reference pic. id=m);
Else if mvL0$_j$ exists and the corresponding reference picture is in the list 0 of the current picture,
then mvL0=mvL0$_j$ (reference pic. id=j);
Else,
mvL0 is not available.

Figure 7:
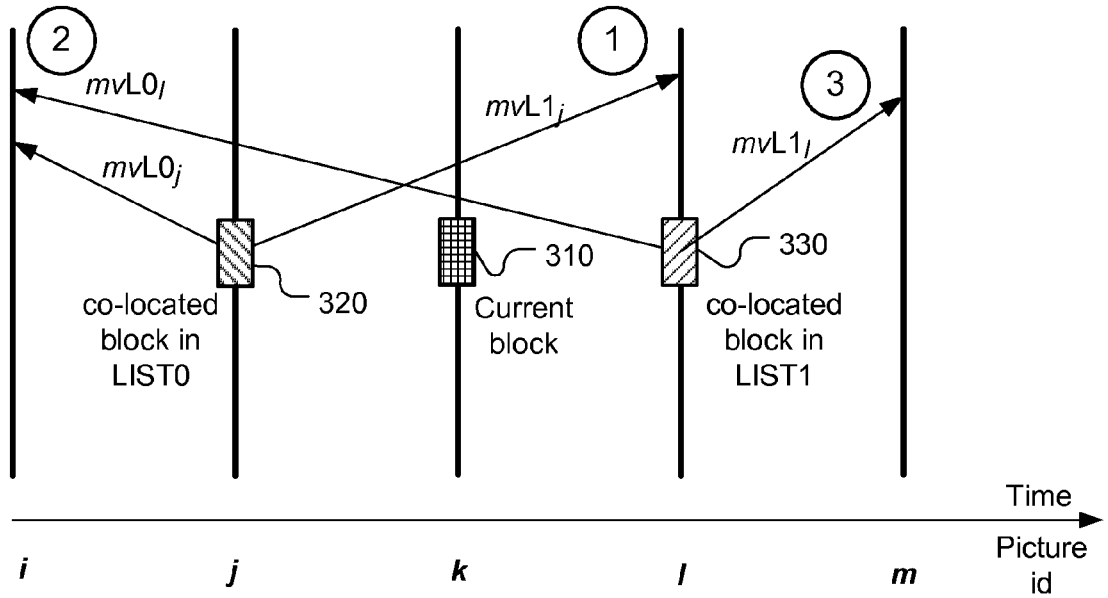
FIG. 7 illustrates an alternative pre-defined priority order for the four motion vectors of FIG. 3, where only three of the four motion vectors are used as candidates for motion vector predictor.

Similarly, three of the four motion vectors in FIG. 3 can be used to determine the motion vector predictor or motion vector predictor candidate for the current block 310 to use a reference picture in list 1 as shown in FIG. 7:

If mvL1$_j$ exists and the corresponding reference picture is in the list 1 of the current picture,
then mvL1=mvL1$_j$ (reference pic. id=m);
Else if mvL0$_i$ exists and the corresponding reference picture is in the list 1 of the current picture,
then mvL1=mvL0$_i$ (reference pic. id=i−1);
Else if mvL1$_l$ exists and the corresponding reference picture is in the list 1 of the current picture,
then mvL1=mvL1$_l$ (reference pic. id=l);
Else,
mvL1 is not available.

Figure 8:
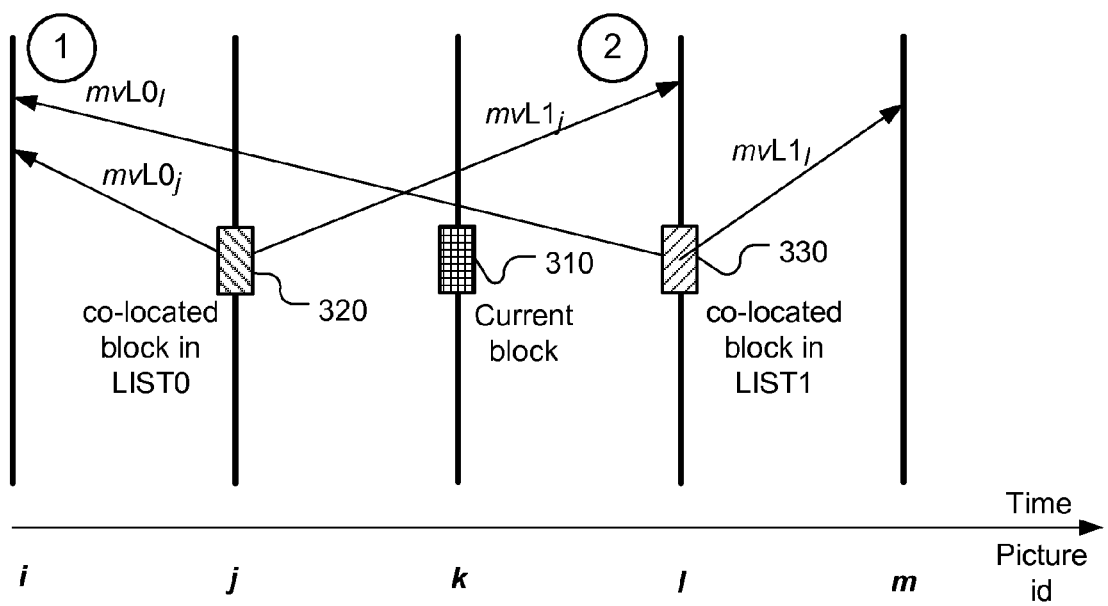
FIG. 8 illustrates an example of pre-defined priority order for the four motion vectors of FIG. 3, where only two of the four motion vectors are used as candidates for motion vector predictor.

In another example, two of the four motion vectors in FIG. 3 can be used to determine the motion vector predictor or motion vector predictor candidate for the current block 310 to use a reference picture in list 0 as shown in FIG. 8:

If mvL0$_i$ exists and the corresponding reference picture is in the list 0 of the current picture,
then mvL0=mvL0$_i$ (reference pic. id=i−1);
Else if mvL1$_j$ exists and the corresponding reference picture is in the list 0 of the current picture,
then mvL0=mvL1$_j$ (reference pic. id=m);
Else,
mvL0 is not available.

Figure 9:
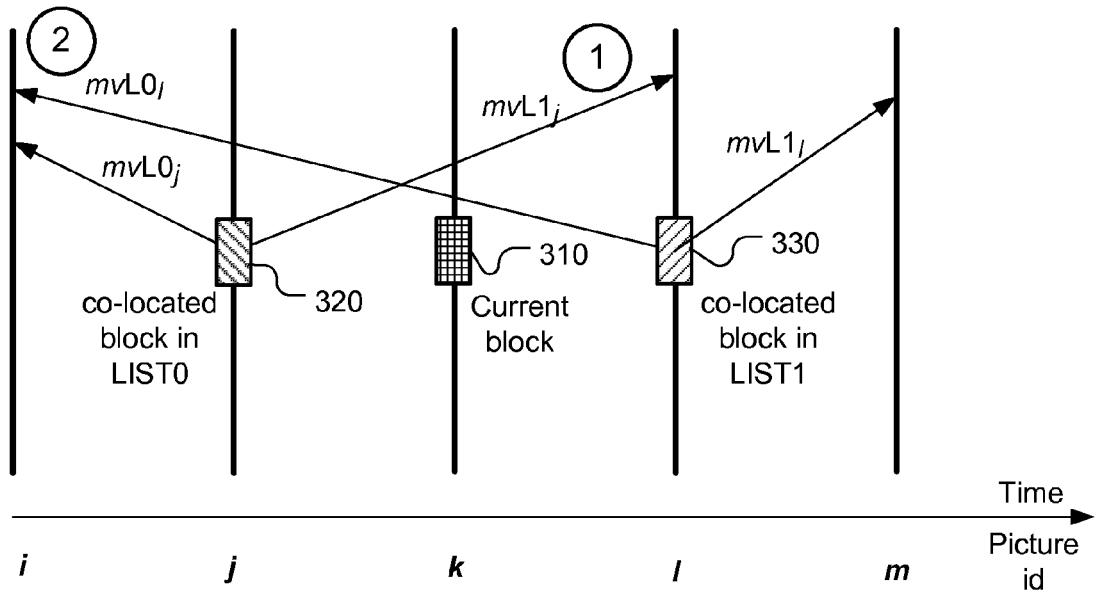
FIG. 9 illustrates an alternative pre-defined priority order for the four motion vectors of FIG. 3, where only two of the four motion vectors are used as candidates for motion vector predictor.

Similarly, two of the four motion vectors in FIG. 3 can be used to determine the motion vector predictor or motion vector predictor candidate for the current block 310 to use a reference picture in list 1 as shown in FIG. 9:

If mvL1$_j$ exists and the corresponding reference picture is in the list 1 of the current picture,
then mvL1=mvL1$_j$ (reference pic. id=m);
Else if mvL0$_i$ exists and the corresponding reference picture is in the list 1 of the current picture,
then mvL1=mvL0$_i$ (reference pic. id=i−1);
Else,
mvL1 is not available.

It is not restricted to use at least one motion vector associated with a temporal block from a list 0 reference picture and at least one motion vector associated with a temporal block from a list 1 reference picture to determine the motion vector predictor or motion vector predictor candidate for the current block. In some other embodiments, a priority order is incorporated in the bitstream, such as in a sequence header, a picture header, or a slice header; and the motion vector predictor or motion vector predictor candidate for the current block 310 is determined from two motion vectors mvL0$_i$ and mvL1$_i$ associated with the list 1 co-located block 330 according to the priority order. In another example, the motion vector predictor or motion vector predictor candidate for the current block 310 is determined from two motion vectors mvL0$_j$ and mvL1$_j$ associated with the list 0 co-located block 320 according to the priority order incorporated in a sequence header, picture header, or slice header.

While the examples illustrated above use co-located motion vectors of reference pictures in the future with RefIdxL1=0 and in the past with RefIdxL0=0 as candidates of motion vector predictor or motion vector predictor candidate for the current block, scaled co-located motion vectors of the corresponding reference pictures may also be used as candidates. A method of motion vector scaling has been described in FIGS. 1 and 2 and associated text. The same scaling method can be used to derive the scaled motion vectors for the present invention. FIG. 10A illustrates an example of motion vector prediction based on scaled motion vectors of list 0 and list 1 co-located blocks when the current list is list 0 and RefIdxL0=0. The scaled motion vectors corresponding to mvL0$_i$, mvL1$_j$, mvL0$_j$ and mvL1$_i$ are labeled as 1002, 1004, 1006 and 1008 respectively. The scaled motion vector represents the motion vector between the current block and the reference picture in list 0 with RefIdxL0=0 by scaling the list 0 or list 1 co-located motion vector. Therefore, instead of using mvL0$_i$, mvL1$_j$, mvL0$_j$, and mvL1$_i$ as the candidates for motion vector predictor or motion vector predictor candidate, the scaled motion vectors 1002, 1004, 1006 and 1008 are used as the candidates for motion vector predictor or motion vector predictor candidate. The scaled motion vectors may provide better prediction than the non-scaled motion vectors. FIG. 10B illustrates an example of motion vector prediction based on scaled motion vectors of list 0 and list 1 co-located blocks when the current list is list 1 and RefIdxL1=0. The scaled motion vectors corresponding to mvL1$_j$, mvL0$_i$, mvL1$_i$ and mvL0$_j$, are labeled as 1012, 1014, 1016 and 1018 respectively. The scaled motion vector represents the motion vector between the current block and the reference picture in list 1 with RefIdxL1=0 by scaling the list 0 or list 1 co-located motion. Therefore, instead of using mvL1$_j$, mvL0$_i$, mvL1$_i$ and mvL0$_j$ as the candidates for motion vector predictor or motion vector predictor candidate, the scaled motion vectors 1012, 1014, 1016 and 1018 are used as the candidates for motion vector predictor or motion vector predictor candidate. The scaled motion vectors may provide better prediction than the non-scaled motion vectors.

Figure 11:
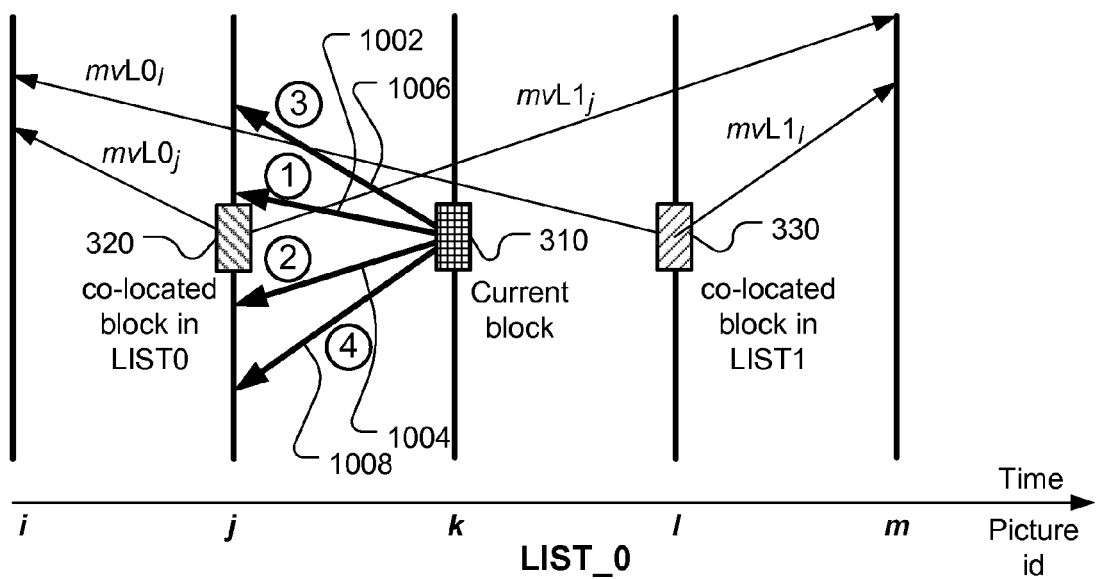
FIG. 11 illustrates an example of pre-defined priority order for the scaled four motion vectors of FIG. 10A.

Similar to the case for non-scaled motion vectors, a pre-defined priority order can be assigned to the scaled motion vectors for list 0 motion vector prediction. The list 0 reference picture index RefIdxL0 can be implicitly derived or explicitly transmitted in the bitstream. In the case that the current list is list 0 and RefIdxL0=0, the pre-defined priority order for the scaled motion vectors of FIG. 10A is shown in FIG. 11. The motion vector predictor or motion vector predictor candidate is determined according to the following priority order:

If mvL0$_i$ exists,
    then mvL0=scaled mvL0$_i$ (motion vector 1002);
Else if mvL1$_j$ exists,
    then mvL0=scaled mvL1$_j$ (motion vector 1004);
Else if mvL0$_j$ exists,
    then mvL0=scaled mvL0$_j$ (motion vector 1006);
Else if mvL1$_i$ exists,
    then mvL0=scaled mvL1$_i$ (motion vector 1008);
Else,
    mvL0 is not available.

In another embodiment, the list 0 motion vector prediction (the current list is list 0 and RefIdxL0=0) for driving the motion vector predictor or motion vector predictor candidate for the current block 310 is determined according to the following priority order:

If mvL0$_i$ exists,
    then mvL0=scaled mvL0$_i$ (motion vector 1002);
Else if mvL1$_i$ exists,
    then mvL0=scaled mvL1$_i$ (motion vector 1008);
Else,
    mvL0 is not available.

In this case, only the scaled motion vectors associated with the list 1 co-located block 330 are considered. Information associated with the priority order is incorporated in a sequence header, a picture header, or a slice header.

Yet another embodiment of the list 0 motion vector prediction (the current list is list 0 and RefIdxL0=0) determines the motion vector predictor or motion vector predictor candidate for the current block 310 according to the following priority order:

If mvL1$_j$ exists,
    then mvL0=scaled mvL1$_j$ (motion vector 1004);
Else if mvL0$_j$ exists,
    then mvL0=scaled mvL0$_j$ (motion vector 1006);
Else,
    mvL0 is not available.
    In this case, only the scaled motion vectors associated with the list 0 co-located block 320 are considered. Information associated with the priority order is incorporated in a sequence header, a picture header, or a slice header.

Figure 12:
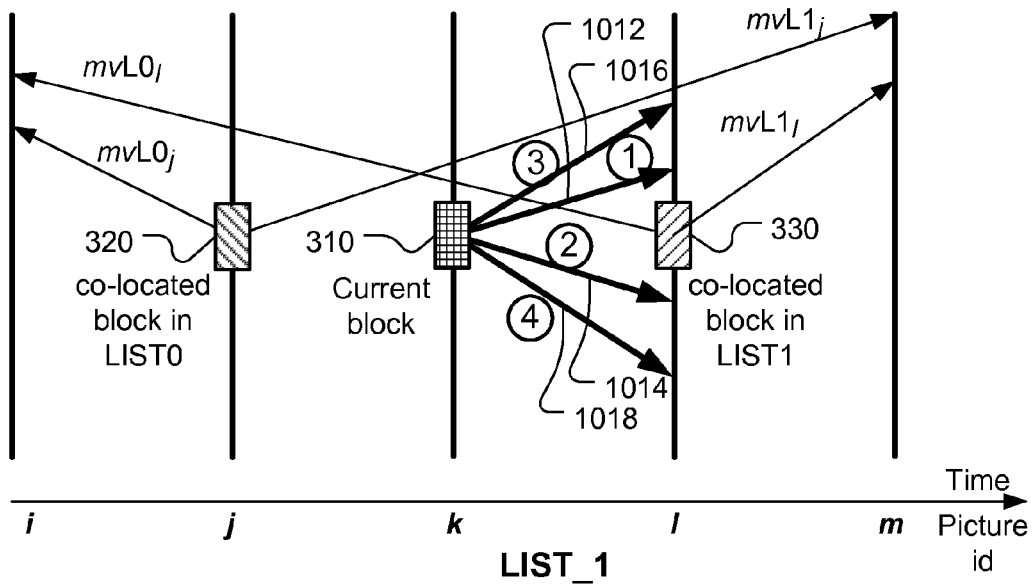
FIG. 12 illustrates an example of pre-defined priority order for the scaled four motion vectors of FIG. 10B.

A pre-defined priority order can also be assigned to the scaled motion vectors for list 1 motion vector prediction. The List 1 reference picture index RefIdxL1 can be implicitly derived or explicitly transmitted in the bitstream. In the case that the current list is list 1 and RefIdxL1=0, the pre-defined priority order for the scaled motion vectors of FIG. 10B is shown in FIG. 12. The motion vector predictor or motion vector predictor candidate is determined according to the following priority order:

If mvL1$_j$ exists,
    then mvL1=scaled mvL1$_j$;
Else if mvL0$_i$ exists,
    then mvL1=scaled mvL0$_i$;
Else if mvL1$_i$ exists,
    then mvL1=scaled mvL1$_i$;
Else if mvL0$_j$ exists,
    then mvL1=scaled mvL0$_j$;
Else,
    mvL1 is not available.

Similarly, the list 1 motion vector prediction (the current list is list 1 and RefIdxL1=0) may only consider scaled motion vectors associated with the list 0 co-located block 320 (i.e. motion vectors 1012 and 1018) according to a pre-defined priority order incorporated in the bitstream; or it may only consider scaled motion vectors associated with the list 1 co-located block 330 (i.e. motion vectors 1014 and 1016) according to a pre-defined priority order incorporated in the bitstream.

It is also possible to choose two or three scaled motion vectors in FIG. 11 or FIG. 12 as candidates for motion vector predictor or motion vector predictor candidate, and the motion vector predictor or motion vector predictor candidate for the current block is determined from the candidates according to a priority order. For example, the candidates candidate include two motion vectors 1002 and 1004 of FIG. 11, and according to a priority order, the motion vector 1002 will be considered before the motion vector 1004. In another embodiment, the candidates include three motion vectors 1012, 1014, and 1016 of FIG. 12, and according to a priority order, the motion vector 1012 will be first considered, then the motion vector 1014, and last, the motion vector 1016.

Figure 13:
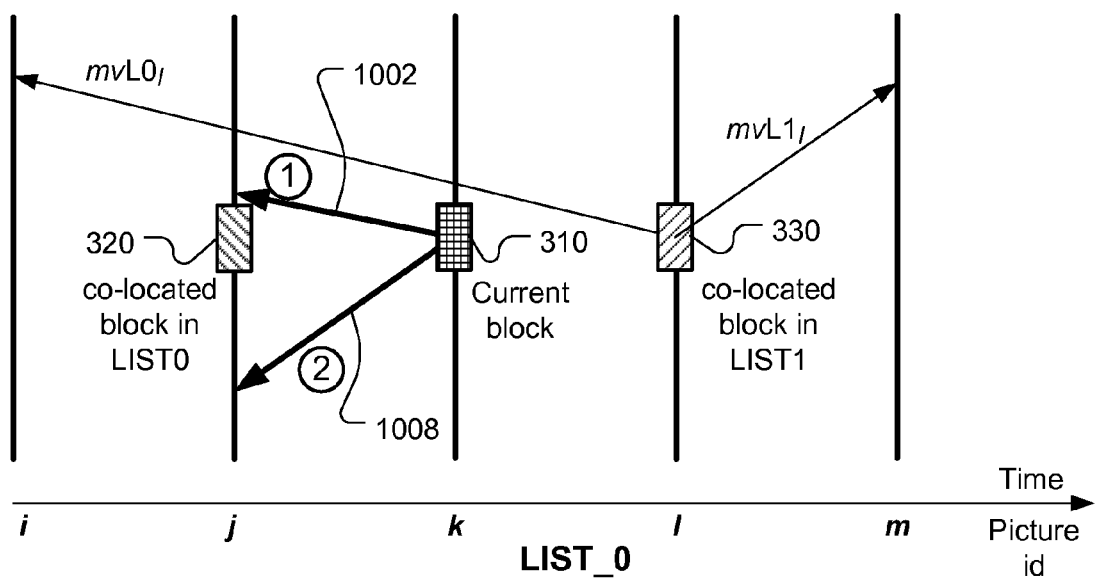
FIG. 13 illustrates an example of pre-defined priority order for scaled motion vectors $mvL0_i$ and $mvL1_i$ of FIG. 10A.

As previously described, while the example in FIG. 11 considers all scaled motion vectors corresponding to list 0 and list 1 co-located motion vectors as candidates for motion vector predictor or motion vector predictor candidate, the candidates can be limited to scaled motion vectors corresponding to the co-located block in list 0 or list 1 only. As before, the list 0 reference picture index RefIdxL0 can be implicitly derived or explicitly transmitted in the bitstream. In the case that the current list is list 0 and RefIdxL0=0, only the scaled motion vectors associated with the co-located block in list 1 may be considered as candidates. An example of pre-defined priority order for this case is shown in FIG. 13. Information of the current list is list 0 can be incorporated or defined in each prediction unit (PU). The motion vector predictor or motion vector predictor candidate is determined according to the following priority order:

If mvL0$_i$ exists,
    then mvL0=scaled mvL0$_i$;
Else if mvL1$_i$ exists,
    then mvL0=scaled mvL1$_i$;
Else,
    mvL0 is not available.

Figure 14:
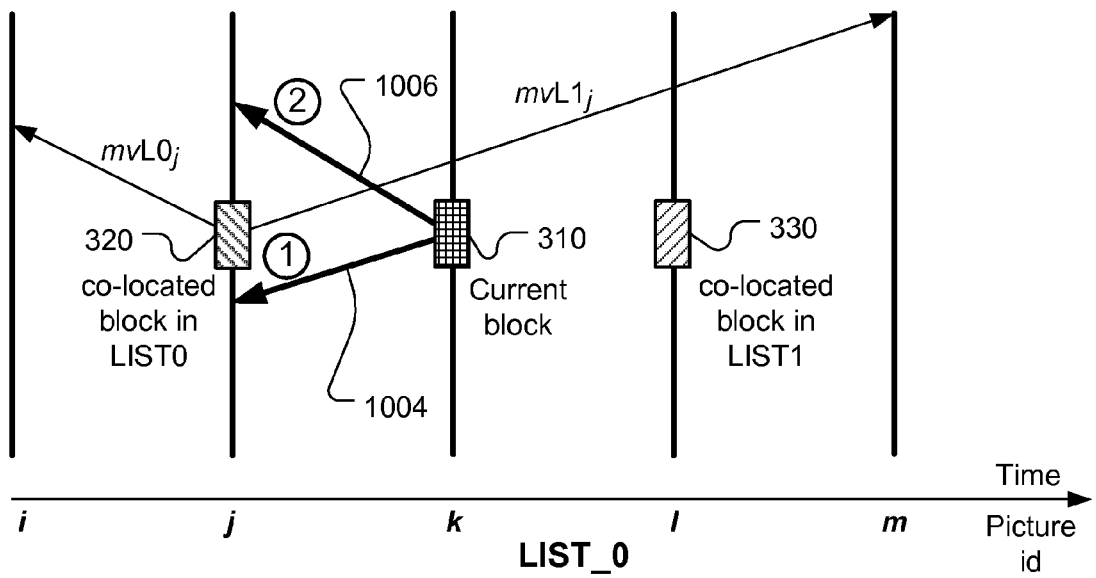
FIG. 14 illustrates an example of pre-defined priority order for scaled motion vectors $mvL1_j$ and $mvL0_j$ of FIG. 10A.

In the above example, if only the motion vectors associated with the co-located block in list 0 are considered as candidates, an example of pre-defined priority order for this case is shown in FIG. 14. The motion vector predictor or motion vector predictor candidate is determined according to the following priority order:

If mvL1$_j$ exists,
    then mvL0=scaled mvL1$_j$;
Else if mvL0$_j$ exists,
    then mvL0=scaled mvL0$_j$;
Else,
    mvL0 is not available.

Figure 15B:
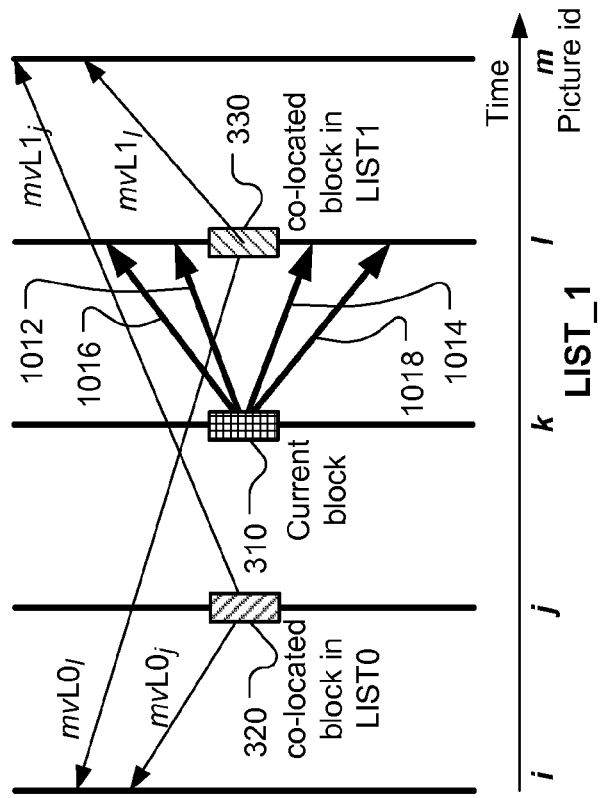
FIG. 15B illustrates an example of motion vector prediction using scaled motion vectors derived for the current block with the current list equal to list 1 and RefIdxL1=0 reference picture and non-scaled motion vectors of the co-located block from list 0 and list 1 reference pictures.
Figure 15A:
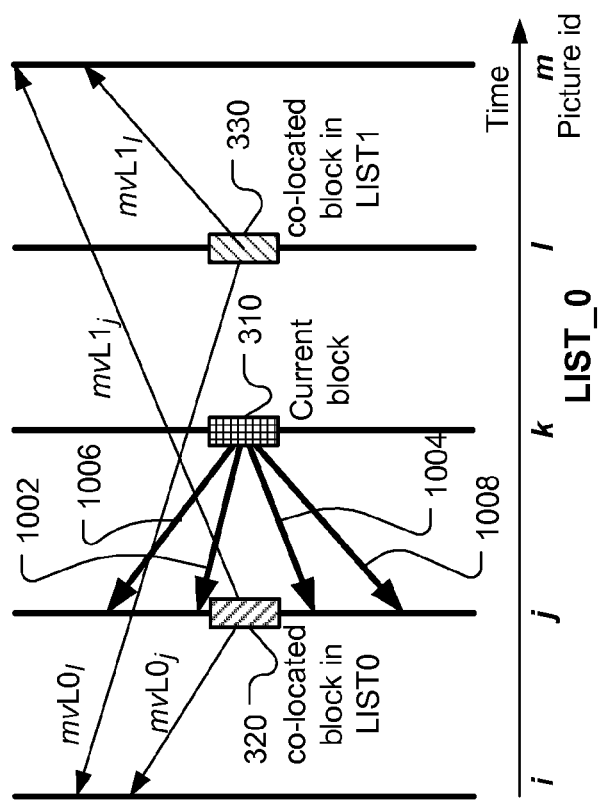
FIG. 15A illustrates an example of motion vector prediction using scaled motion vectors derived for the current block with the current list equal to list 0 and RefIdxL0=0 reference picture and non-scaled motion vectors of co-located blocks from list 0 and list 1 reference pictures.

In the above examples, the motion vector prediction is either based on scaled motion vectors or non-scaled motion vectors of list 0 and list 1 co-located motion vectors. The scaled motion vectors and the non-scaled motion vectors of list 0 and list 1 co-located motion vectors can be combined to provide more choices for better motion vector prediction. FIG. 15A illustrates an example of motion vector prediction using scaled motion vectors and non-scaled motion vectors. Both scaled motion vectors 1002, 1004, 1006 and 1008 between the current block 310 and the reference picture in list 0 with picture id=j, and non-scaled motion vectors $mvL0_j$, $mvL1_j$, $mvL0_j$, and $mvL1_l$ of the co-located blocks in the future and past reference pictures are used as the candidates for motion vector predictor or motion vector predictor candidate. FIG. 15B illustrates an example of motion vector prediction using scaled motion vectors and non-scaled motion vectors. Both scaled motion vectors 1012, 1014, 1016 and 1018 between the current block 310 and the reference picture in list 1 with picture id=l, and non-scaled motion vectors $mvL1_j$, $mvL0_j$, $mvL1_l$ and $mvL0_j$ are used as the candidates for motion vector predictor or motion vector predictor candidate.

Figure 16:
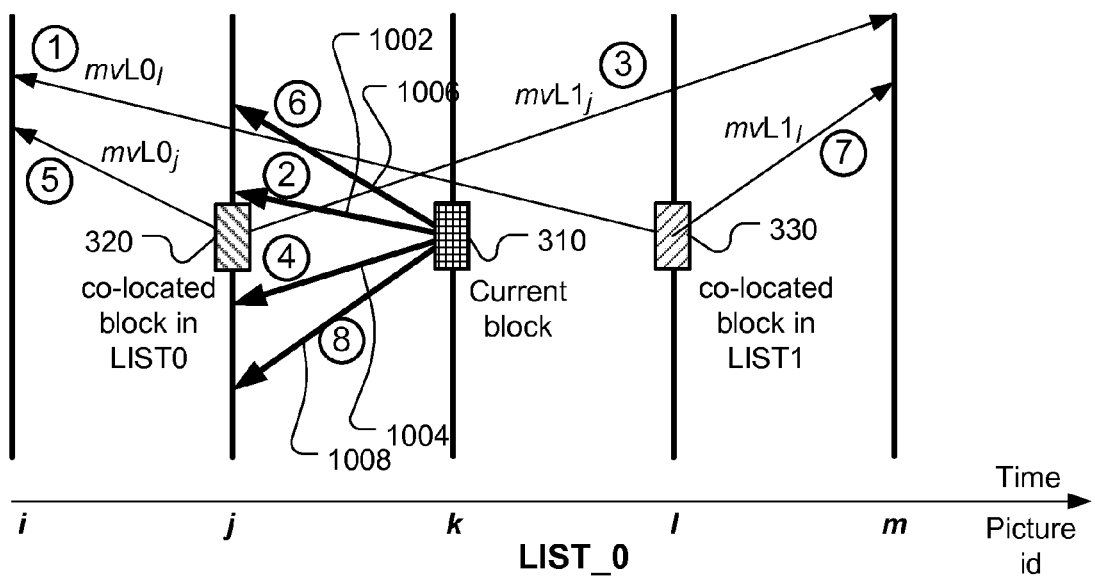
FIG. 16 illustrates an example of pre-defined priority order for the scaled and non-scaled motion vectors of FIG. 15A.

FIG. 16 illustrates an example of motion vector prediction using both scaled motion vectors and non-scaled motion vectors of the co-located block in the future and past reference pictures as the candidates for motion vector predictor as shown in FIG. 15A. The candidates for motion vector predictor or motion vector predictor candidate include scaled motion vectors 1002, 1004, 1006 and 1008 between the current block 310 and the reference picture in list 0 with picture id=j, and non-scaled motion vectors $mvL0_j$, $mvL1_j$, $mvL0_j$, and $mvL1_l$ of co-located blocks in the future and past reference pictures are used as the candidates for motion vector predictor or motion vector predictor candidate. The determination of the predictor or predictor candidate is according to the following pre-defined priority order:

If $mvL0_l$ exists and the corresponding reference picture (pic. id=i−1) is in the list 0 of the current picture,
then mvL0=$mvL0_l$ (reference pic. id=i−1);
Else,
mvL0=scaled $mvL0_l$ (reference pic. id=j);
Else if $mvL1_j$ exists and the corresponding reference picture (pic. id=m+1) is in the list 0 of the current picture,
then mvL0=$mvL1_j$ (reference pic. id=m+1);
Else,
mvL0=scaled $mvL1_j$ (reference pic. id=j);
Else if $mvL0_j$ exists and the corresponding reference picture (pic. id=j) is in the list 0 of the current picture,
then mvL0=$mvL0_j$ (reference pic. id=j);
Else,
mvL0=scaled $mvL0_j$ (reference pic. id=j);
Else if $mvL1_l$ exists and the reference picture (pic. id=l) is in the list 0 of the current picture,
then mvL0=$mvL1_l$ (reference pic. id=l);
Else,
mvL0=scaled $mvL1_l$ (reference pic. id=j);
Else,
mvL0 is not available.

Figure 17:
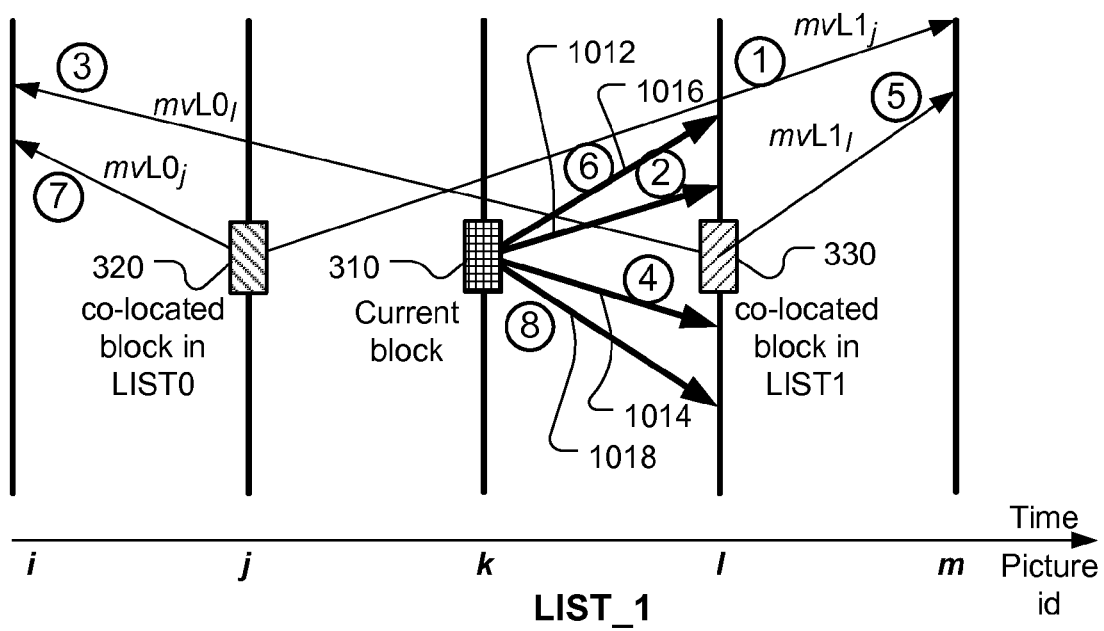
FIG. 17 illustrates an example of pre-defined priority order for the scaled and non-scaled motion vectors of FIG. 15B.

FIG. 17 illustrates an example of motion vector prediction using both scaled motion vectors and non-scaled motion vectors of the co-located block in the future and past reference pictures as the candidates for motion vector predictor as shown in FIG. 15B. The candidates for motion vector predictor or motion vector predictor candidate include scaled motion vectors 1012, 1014, 1016 and 1018 between the current block 310 and the reference picture in list 1 with picture id=l, and non-scaled motion vectors $mvL0_j$, $mvL1_j$, $mvL0_j$, and $mvL1_l$ of the co-located block in the future and past reference pictures are used as the candidates for motion vector predictor or motion vector predictor candidate. The determination of the predictor or predictor candidate is according to the following pre-defined priority order:

If $mvL1_j$ exists and the corresponding reference picture (id=m+1) is in the list 1 of the current picture,
then mvL1=$mvL1_j$ (reference pic. id=m+1);
Else,
mvL1=scaled $mvL1_j$ (reference pic. id=l);
Else if $mvL0_l$ exists and the corresponding reference picture (id=i−1) is in the list 1 of the current picture,
then mvL1=$mvL0_l$ (reference pic. id=i−1);
Else,
mvL1=scaled $mvL0_l$ (reference pic. id=l);
Else if $mvL1_l$ exists and the corresponding reference picture (pic. id=l) is in the list 1 of the current picture,
then mvL1=$mvL1_l$ (reference pic. id=l);
Else,
mvL1=scaled $mvL1_l$ (reference pic. id=l);
Else if $mvL0_j$ exists and the corresponding reference picture (pic. id=j) is in the list 1 of the current picture,
then mvL1=$mvL0_j$ (reference pic. id=j);
Else,
mvL1=scaled $mvL0_j$ (reference pic. id=l);
Else,
mvL1 is not available.

In the above examples of motion vector prediction according to a pre-defined priority order, a respective priority order is used in each example to illustrate the process of determining a motion vector predictor or a motion vector predictor candidate from the motion vector candidates. The particular priority order used is by no means construed as a limitation to the present invention. A skilled person in the field may choose different priority orders for the motion vector candidates to implement the present invention. Furthermore, while the above examples illustrate that the order of motion vector among the candidates is determined according to a pre-defined priority order, the priority order of the candidates can also be performed according to an adaptive scheme. The scheme of adaptive priority ordering can be based on the statistic of the reconstructed motion vectors of previous blocks, the partition type of current block, the correlation of the motion vectors, the directions of motion vector, whether the direction of scaled motion vector is interpolation or extrapolation, the distance of the motion vectors, or whether the motion vector crosses current block in the case of temporal motion vector. Also, the adaptive scheme may also be based on a combination of two or more of the factors mentioned above.

When the statistic of the reconstructed motion vectors of previous blocks is used for the adaptive scheme, the statistic may be associated with the counts of the motion vector candidates as an example. The priority order is adapted to the counts of the motion vector candidates, where the motion vector candidate having a higher count will be assigned a higher priority for motion vector predictor. When the partition type of current block is used for the adaptive scheme, for example, if a current coding unit of size 2N×2N is divided into two rectangular prediction units of size N×2N and the current block is the left prediction unit, the motion vector with higher similarity to the left neighbor of the current coding unit will be assigned a higher priority; if a current coding unit of size 2N×2N is divided into two rectangular prediction units of size N×2N and the current block is the right prediction unit, the motion vector with higher similarity to the above right neighbor of the current coding unit will be assigned a higher priority. When the correlation of the motion vectors is used for the adaptive scheme, the motion vector with higher correlation will be assigned with a higher priority. For example, if two motion vectors in the priority list are exactly the same, the motion vector is considered to have higher correlation. When the direction of motion vector is used for the adaptive scheme, the motion vector pointing to the direction of the target reference picture, as an example, will be assigned with a higher priority. When the direction of scaled MV being interpolation or extrapolation is used for the adaptive scheme, the scaled motion vectors with the process of interpolation, as an example, will be assigned with a higher priority. When the distance of the motion vectors is used for the adaptive scheme, a shorter temporal distance for the motion vector from a current block to the target reference picture, as an example, will be assigned with a higher priority. When the coverage of a temporal motion vector is used as the adaptive scheme, the coverage of the motion vector over a current block will be assigned a higher priority.

It is noted that the present invention can be applied to not only Inter mode but also Skip, Direct, and Merge modes. In the Inter mode, given a current list, a motion vector predictor is used to predict the motion vector of a PU, and a motion vector residue is transmitted. The current invention can be applied for deriving the motion vector predictor when the motion vector competition scheme is not used or for deriving the motion vector predictor candidate when the motion vector scheme is used. As for the Skip, Direct, and Merge, they can be regarded as special cases of the Inter mode where the motion vector residue is not transmitted and always inferred as zero. In these cases, the current invention can be applied for deriving the motion vector when the motion vector competition scheme is not used or for deriving the motion vector candidate when the motion vector scheme is not used.

Embodiment of motion vector prediction according to the present invention as described above may be implemented in various hardware, software codes, or a combination of both. For example, an embodiment of the present invention can be a circuit integrated into a video compression chip or program codes integrated into video compression software to perform the processing described herein. An embodiment of the present invention may also be program codes to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware codes may be developed in different programming languages and different format or style. The software code may also be compiled for different target platform. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method of deriving a motion vector predictor or motion vector predictor candidate or motion vector or motion vector candidate for a current block in a current picture, the method comprising:

receiving two or more motion vectors of one temporal block in a first reference picture in a first list selected from a group consisting of list 0 and list 1, wherein a first motion vector of said two or more motion vectors points to another reference picture in the first list and a second motion vector of said two or more motion vectors points to a second reference picture in a second list different from the first list;

determining a candidate set based on said two or more motion vectors, wherein said determining the candidate set comprises deriving a first scaled motion vector from the first motion vector and a second scaled motion vector from the second motion vector for the candidate set; and determining the motion vector predictor or motion vector predictor candidate or motion vector or motion vector candidate for the current block from the candidate set according to a priority order of said at least two motion vectors.

2. The method of claim 1, wherein the priority order is a pre-defined priority order.

3. The method of claim 2, wherein information associated with the pre-defined priority order is incorporated in a sequence header, a picture header, or a slice header.

4. The method of claim 1, wherein the priority order is determined according to an adaptive scheme.

5. The method of claim 4, wherein the adaptive scheme is based on a criterion selected from a second group consisting of:

statistic of reconstructed motion vectors of previous blocks, partition type of the current block, correlation of the motion vectors, directions of motion vectors, distance of the motion vectors, and whether the motion vectors cross the current block in a case of temporal motion vector.

6. The method of claim 1, wherein the candidate set is selected from said two or more motion vectors.

7. The method of claim 1, wherein said determining the candidate set comprises deriving scaled motion vectors corresponding to said two or more motion vectors, wherein the candidate set is selected from the scaled motion vectors or a combination of said two or more motion vectors and the scaled motion vectors.

8. The method of claim 7, wherein the candidate set is selected from the scaled motion vectors.

9. The method of claim 7, wherein the candidate set is selected from said two or more motion vectors and the scaled motion vectors.

10. The method of claim 7, wherein the priority order is according to an adaptive scheme based on whether directions of scaled motion vectors are interpolation or extrapolation.

11. An apparatus of deriving a motion vector predictor or motion vector predictor candidate or motion vector or motion vector candidate for a current block in a current picture, the apparatus comprising:

means for receiving two or more motion vectors of one temporal block in a first reference picture in a first list selected from a group consisting of list 0 and list 1, wherein a first motion vector of said two or more motion vectors points to another reference picture in the first list and a second motion vector of said two or more motion vectors points to a second reference picture in a second list different from the first list;

means for determining a candidate set based on said two or more motion vectors, wherein said means for determining the candidate set comprises means for deriving a first scaled motion vector from the first motion vector and a second scaled motion vector from the second motion vector for the candidate set; and means for determining the motion vector predictor or motion vector predictor candidate or motion vector or motion vector candidate for the current block from the candidate set according to a priority order of said at least two motion vectors.

12. The apparatus of claim 11, wherein the priority order is a pre-defined priority order.

13. The apparatus of claim 12, wherein information associated with the pre-defined priority order is incorporated in a sequence header, a current picture header, or a slice header.

14. The apparatus of claim 11, wherein the priority order is determined according to an adaptive scheme.

15. The apparatus of claim 14, wherein the adaptive scheme is based on a criterion selected from a second group consisting of:
   statistic of reconstructed motion vectors of previous blocks,
   partition type of the current block,
   correlation of the motion vectors,
   directions of motion vectors,
   distance of the motion vectors, and
   whether the motion vectors cross the current block in a case of temporal motion vector.

16. The apparatus of claim 11, wherein the candidate set is selected from said two or more motion vectors.

17. The apparatus of claim 11, wherein said means for determining the candidate set comprises means for deriving scaled motion vectors corresponding to said two or more motion vectors, wherein the candidate set is selected from the scaled motion vectors or a combination of said two or more motion vectors and the scaled motion vectors.

18. The apparatus of claim 17, wherein the candidate set is selected from the scaled motion vectors.

19. The apparatus of claim 17, wherein the candidate set is selected from said two or more motion vectors and the scaled motion vectors.

20. The apparatus of claim 17, wherein the priority order is according to an adaptive scheme based on whether directions of scaled motion vectors are interpolation or extrapolation.

21. A method of deriving a motion vector predictor or motion vector predictor candidate or motion vector or motion vector candidate for a current block in a current picture, the method comprising:
   receiving two or more motion vectors of at least one temporal block in a first reference picture from a first reference picture list selected from a group consisting of list 0 and list 1, wherein a first motion vector of said two or more motion vectors points to another reference picture in the first list and a second motion vector of said two or more motion vectors points to a second reference picture in a second list different from the first list;
   determining a candidate set based on said two or more motion vectors, wherein said determining the candidate set comprises deriving a first scaled motion vector from the first motion vector and a second scaled motion vector from the second motion vector for the candidate set; and
   determining the motion vector predictor or motion vector predictor candidate or motion vector or motion vector candidate for the current block from the candidate set according to a priority order of said at least two motion vectors;
   wherein information associated with the priority order is incorporated in a sequence header, a picture header, or a slice header.

22. The method of claim 21, wherein the candidate set is selected from said two or more motion vectors.

23. The method of claim 21, wherein said determining the candidate set comprises deriving scaled motion vectors corresponding to said two or more motion vectors, wherein the candidate set is selected from the scaled motion vectors or a combination of said two or more motion vectors and the scaled motion vectors.

24. The method of claim 23, wherein the candidate set is selected from the scaled motion vectors.

25. The method of claim 21, wherein the first reference picture list is a list 0 reference picture or a list 1 reference picture.

26. An apparatus of deriving a motion vector predictor or motion vector predictor candidate or motion vector or motion vector candidate for a current block in a current picture, the apparatus comprising:
   means for receiving two or more motion vectors of at least one temporal block in a first reference picture from a first reference pictures list selected from a group consisting of list 0 and list 1, wherein a first motion vector of said two or more motion vectors points to another reference picture in the first list and a second motion vector of said two or more motion vectors points to a second reference picture in a second list different from the first list;
   means for determining a candidate set based on said two or more motion vectors, wherein said means for determining the candidate set comprises means for deriving a first scaled motion vector from the first motion vector and a second scaled motion vector from the second motion vector for the candidate set; and
   means for determining the motion vector predictor or motion vector predictor candidate or motion vector or motion vector candidate for the current block from the candidate set according to a priority order of said at least two motion vectors;
   wherein information associated with the priority order is incorporated in a sequence header, a picture header, or a slice header.

27. The apparatus of claim 26, wherein the candidate set is selected from said two or more motion vectors.

28. The apparatus of claim 26, wherein said means for determining the candidate set comprises means for deriving scaled motion vectors corresponding to said two or more motion vectors, wherein the candidate set is selected from the scaled motion vectors or a combination of said two or more motion vectors and the scaled motion vectors.

29. The apparatus of claim 28, wherein the candidate set is selected from the scaled motion vectors.

30. The method of claim 1, wherein the priority order is determined on an individual block basis.

31. The method of claim 1, wherein the priority order is determined on an individual slice basis.

32. The method of claim 1, wherein the first list corresponds to the list 1 and the second scaled motion vector has a higher priority than the first scaled motion vector.

33. The method of claim 1, wherein the first list corresponds to the list 0 and the second scaled motion vector has a higher priority than the first scaled motion vector.

34. The method of claim 1, wherein the first list corresponds to the list 0 and the first scaled motion vector has a higher priority than the second scaled motion vector.

* * * * *